(12) United States Patent
Rathod et al.

(10) Patent No.: US 12,479,595 B2
(45) Date of Patent: Nov. 25, 2025

(54) METHOD TO DETECT OBJECTS OR OBSTACLES USING RADIO

(71) Applicant: B/E AEROSPACE, INC., Winston Salem, NC (US)

(72) Inventors: Vivek T. Rathod, Lynnwood, WA (US); Adwait A. Trikanad, Hillsboro, OR (US); Sanjay G. Bajekal, Snohomish, WA (US)

(73) Assignee: B/E AEROSPACE, INC., Winston Salem, NC (US)

( * ) Notice: Subject to any disclaimer, the term of this patent is extended or adjusted under 35 U.S.C. 154(b) by 251 days.

(21) Appl. No.: 18/485,199

(22) Filed: Oct. 11, 2023

(65) Prior Publication Data
US 2025/0121950 A1 Apr. 17, 2025

(51) Int. Cl.
*B64D 45/00* (2006.01)
*G01S 7/35* (2006.01)
*G01S 13/32* (2006.01)

(52) U.S. Cl.
CPC .............. *B64D 45/00* (2013.01); *G01S 7/352* (2013.01); *G01S 13/32* (2013.01)

(58) Field of Classification Search
None
See application file for complete search history.

(56) References Cited

U.S. PATENT DOCUMENTS

| | | | | |
|---|---|---|---|---|
| 5,673,050 A | * | 9/1997 | Moussally | G01S 13/0209 342/25 F |
| 7,194,346 B2 | * | 3/2007 | Griffin | B60R 21/01536 701/45 |
| 8,152,198 B2 | * | 4/2012 | Breed | B60R 21/01516 701/45 |

(Continued)

FOREIGN PATENT DOCUMENTS

| | | |
|---|---|---|
| DE | 102017010308 | 5/2018 |
| GB | 2525867 | 11/2015 |
| WO | 2009062614 | 5/2009 |

OTHER PUBLICATIONS

Regani et al., "mmWrite: Passive Handwriting Tracking Using a Single Millimeter-Wave Radio," IEEE Internet of Things Journal, vol. 8, No. 17, pp. 13291-13305, 2021.

(Continued)

*Primary Examiner* — Daniel L Greene
(74) *Attorney, Agent, or Firm* — SNELL & WILMER L.L.P.

(57) ABSTRACT

A system for localizing and object is disclosed herein. The system includes a radio transmitter disposed in a first location, a radio receiver disposed in a second location, a processor operatively coupled to the radio transmitter and to the radio receiver, and a memory operatively coupled to the processor. The memory includes instructions stored thereon that, when executed by the processor, cause the processor to send a first command to the radio transmitter to transmit a continuous radio wave, send a second command to the radio (Continued)

receiver to receive a reflected radio wave, receive from the radio receiver a signal indicating the reflected radio wave is within a spatial region of interest, and determining a three-dimensional location of the object within the spatial region of interest based on the reflected radio wave.

19 Claims, 8 Drawing Sheets

(56) References Cited

U.S. PATENT DOCUMENTS

| | | | |
|---|---|---|---|
| 10,479,524 B2 | 11/2019 | Pozzi et al. | |
| 10,895,638 B2 | 1/2021 | Okamura et al. | |
| 10,915,231 B1* | 2/2021 | Bacon | G06F 3/04847 |
| 11,230,293 B2* | 1/2022 | Gomez | G01S 13/18 |
| 11,468,209 B2* | 10/2022 | Wodrich | G01S 5/0247 |
| 2010/0320819 A1* | 12/2010 | Cohen | A61H 23/0236 |
| | | | 381/104 |
| 2019/0293777 A1* | 9/2019 | Takemoto | G01S 13/42 |
| 2024/0012100 A1* | 1/2024 | Hoshihara | G01S 7/032 |

OTHER PUBLICATIONS

Abuduaini et al., "Performance Evaluation of Multiple Human-Body Localization Using Bistatic MIMO Radar," in 2019 IEEE Asia-Pacific Microwave Conference (APMC), Singapore, 2019, pp. 575-577.

European Patent Office, European Search Report dated May 13, 2025 in Application No. 24204364.4.

European Patent Office, European Partial Search Report dated Feb. 20, 2025 in Application No. 24204364.4.

* cited by examiner

METHOD TO DETECT OBJECTS OR OBSTACLES USING RADIO

FIELD

The present disclosure generally relates detecting objects on an aircraft, and more particularly, to radar based localization of objects on an aircraft.

BACKGROUND

Modern aircraft are designed to make efficient use of the limited space available on board. Passenger seats may be located close together and be designed to move, recline, and lean in order to improve passenger comfort. There are times when objects and/or humans may be in the way of the movement of a passenger seat. Current methods of automated detection and localization of objects and/or humans make use of cameras to track the objects. The use of these vision systems (i.e., cameras) has drawbacks in modern air travel due to privacy concerns.

SUMMARY

A system for localizing an object is disclosed herein. The system includes a radio transmitter disposed in a first location, a radio receiver disposed in a second location, a processor operatively coupled to the radio transmitter and to the radio receiver, and a memory operatively coupled to the processor. The memory includes instructions stored thereon that, when executed by the processor, cause the processor to send a first command to the radio transmitter to transmit a continuous radio wave, send a second command to the radio receiver to receive a reflected radio wave, receive from the radio receiver a signal indicating the reflected radio wave is within a spatial region of interest, and determining a three-dimensional location of the object within the spatial region of interest based on the reflected radio wave.

In various embodiments, the instructions, when executed by the processor, further cause the processor to identify the spatial region of interest for detecting the object, identify a minimum threshold power for detecting the object, and create scanning parameters for use by the radio transmitter and the radio receiver. In various embodiments, the radio transmitter transmits the continuous radio wave using the spatial scanning parameters and the radio receiver receives the reflected radio wave using the spatial scanning parameters. In various embodiments, the instructions, when executed by the processor, further cause the processor to identify power peaks in the spatial region of interest using the reflected radio wave, wherein a peak power amplitude indicates a possible angular location of the object, estimates a location of the object based at least in part on the peak power amplitudes, the first location, and the second location, and determine the three-dimensional location based on the estimated angular location.

In various embodiments, the radio transmitter is a millimeter wave radio including a phased array antenna and, wherein the radio receiver is a millimeter wave radio including a phased array antenna. In various embodiments, the radio transmitter and the radio receiver are disposed in the cabin of an aircraft. In various embodiments, the system further includes a passenger seat, wherein the radio transmitter and the radio receiver are coupled to the passenger seat.

Also disclosed herein is a passenger seat including base, a seat section coupled to a top surface of the base, a footrest coupled to a first side of the base, a backrest coupled to a second side of the base, a transmitter coupled to a third side of the base, a receiver coupled to a fourth side of the base, and a controller operatively coupled to the transmitter and to the receiver. The controller configured to send a command to the transmitter to transmit a scanning radio wave in a spatial region of interest, receive from the transmitter a power level indicating a reflected radio wave within the spatial region of interest, and determine a location of an object adjacent the base based on the power level of the reflected radio wave.

In various embodiments, the passenger seat further includes a motor coupled to the footrest and configured to move the footrest along a path of travel, wherein the controller is further configured to stop the motor in response to determining that the object is located in the path of travel of the footrest. In various embodiments, the passenger seat further includes a motor coupled to the backrest and configured to move the backrest along a path of travel, wherein the controller is further configured to stop the motor in response to determining that the object is located in the path of travel of the backrest.

In various embodiments, the passenger seat further includes a motor coupled to the seat section and configured to move the seat section along a path of travel, wherein the controller is further configured to stop the motor in response to determining that the object is located in the path of travel of the seat section. In various embodiments, the passenger seat further includes a second receiver disposed adjacent the base, wherein the controller is further configured to receive a second power level indicating the reflected radio wave and determine the location of the object based on the power level and the second power level.

In various embodiments, the transmitter is a millimeter wave radio including a phased array antenna and, wherein the receiver is a millimeter wave radio transmitter including a phased array antenna. In various embodiments, the controller is further configured to identify the region of interest, the region of interest defining a three-dimensional space adjacent the passenger seat. In various embodiments, the transmitter is disposed in a first location and the receiver is disposed in a second location, wherein the controller is further configured to determine the location of the object based on the power level of the reflected radio wave, the first location, and the second location.

Also disclosed herein is an aircraft cabin including a first wall, a plurality of passenger seats, and an object localization system including a transmitter attached to the first wall at a first position, a receiver attached to the first wall at a second position, and a controller operatively coupled to the transmitter and the receiver, the controller is configured to send commands to the transmitter to transmit a continuous radio wave within a region of interest in the aircraft cabin, receive data from the receiver indicating power levels of reflected radio waves within the region of interest, and identify a head count of passengers in the plurality of passenger seats based at least in part on the received power levels.

In various embodiments, the transmitter is a millimeter wave radio including a phased array antenna and the receiver is a millimeter wave radio including a phased array antenna. In various embodiments, the controller is further configured to identify the region of interest as a three-dimensional space within the aircraft cabin and identify a minimum threshold power for determining the head count of passengers.

In various embodiments, the controller is further configured to create scanning parameters for use by the transmitter and the receiver, the scanning parameters indicating a discretized angle of azimuth and a discrete angle of elevation within the region of interest. In various embodiments, the aircraft cabin further includes a second wall, wherein the plurality of passenger seats are disposed between the first wall and the second wall, wherein the object localization system further includes a second transmitter attached to the second wall at a third position, and a second receiver attached to the second wall at a fourth position, wherein the controller is operatively coupled to the second transmitter and the second receiver, the controller being further configured to command the second transmitter to transmit a second continuous radio wave and to localize an object adjacent the second wall based at least in part on a second reflected radio wave received from the receiver.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
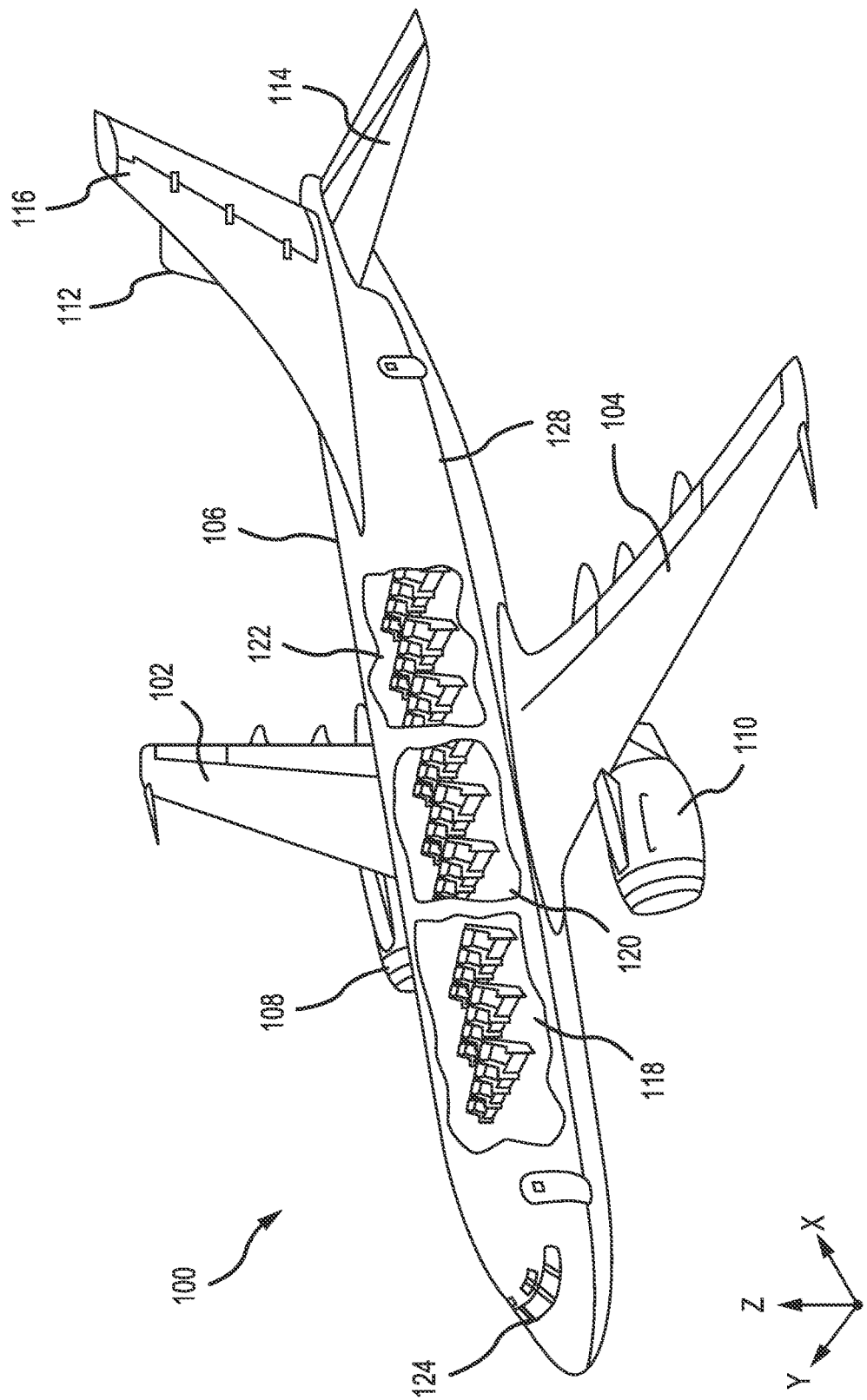
FIGS. 1A and 1B illustrate an aircraft and various sections of an aircraft cabin within the aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein are systems and methods for automated localization of objects and humans without the use of cameras or other vision systems. In various embodiments, localization includes the detection of an object as well as identifying a location in space of the object. Accordingly, the systems and methods disclosed herein, in their various embodiments, may be used in aviation, health care, and surveillance, among others, in part due to improved privacy of not using cameras. In various embodiments, the system includes a transmitter and a receiver that utilize millimeter wave beam forming including but not limited to analog, digital and hybrid, to localize an object and/or obstacle. In various embodiments, the obstacle may be a human or a human body part. In various embodiments, both the transmitter and the receiver determine radio wave reflections from one or more objects that correspond to peaks in the total channel intensity variation with respect to the beam forming angle of the transmitter and the receiver. In various embodiments, the system may use the radio wave angle of departure (AOD) and angle of arrival (AOA) that correspond to each peak to determine the location of one or more objects in 3-dimensional (3D) space.

In various embodiments, the system disclosed herein protects the privacy of persons nearby due to being imaging (i.e., camera) free. In various embodiments, the transmitter and the receiver may be placed behind structures or inside of the enclosures as the radio waves are able to penetrate most materials. In various embodiments, the spatial resolution of the system disclosed herein may depend on the distance of the transmitter to the receiver and of the distance from the transmitter and receiver to the object. The systems and methods disclosed herein may, in their various embodiments, be used in aircraft to ensure that no object, human, or body part is blocking the path of a moving passenger seat.

Referring now to FIG. 1A, an aircraft 100 including various sections within the aircraft is illustrated, in accordance with various embodiments. Aircraft 100 is an example of a passenger or transport vehicle in which one or more automated object localization systems may be implemented, in accordance with various embodiments. In various embodiments, aircraft 100 has a starboard wing 102 and a port wing 104 attached to a fuselage 106. In various embodiments, aircraft 100 also includes a starboard engine 108 connected to starboard wing 102 and a port engine 110 connected to port wing 104. In various embodiments, aircraft 100 also includes a starboard horizontal stabilizer 112, a port horizontal stabilizer 114, and a vertical stabilizer 116. In various embodiments, aircraft 100 also includes various cabin sections, including, for example, a first cabin section 118, a second cabin section 120, a third cabin section 122, and a pilot cabin 124. In various embodiments, cabin sections 118, 120, 122 may include a plurality of passenger seats and a plurality of passenger service units disposed over the plurality of passenger seats.

Figure 1B:
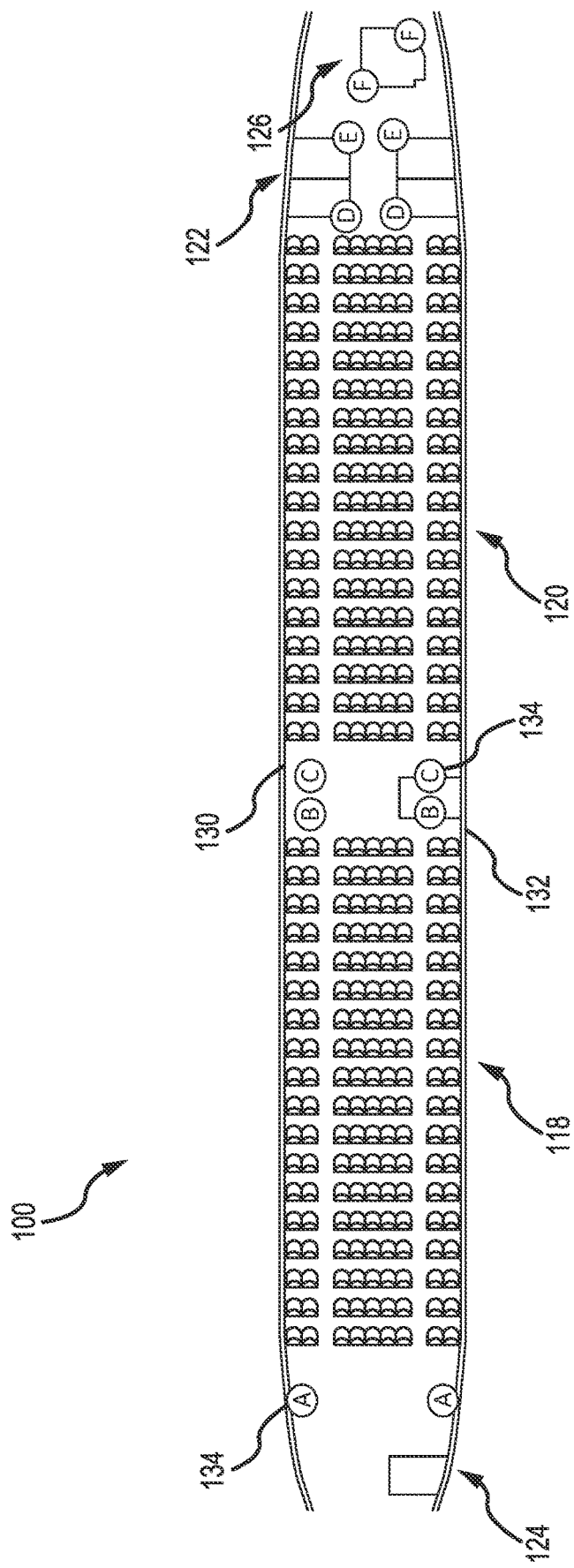

Referring now to FIG. 1B, a partial top view of aircraft 100 including one or more object localization systems is illustrated, in accordance with various embodiments. Aircraft 100 further includes a starboard wall 130 (e.g., in the positive y-direction) and a port wall 132 (e.g., in the negative y-direction). Aircraft 100 further includes object localization sensors 134 spaced through aircraft 100 and arranged in pairs including a transmitter and a receiver. Sensors 134 may be used to detect and/or identify objects or humans within aircraft 100. For example, sensors 134 may be used to identify empty seats on aircraft 100 or to identify human activity within aircraft 100. The pairs of sensors 134 may be placed along an interior of starboard wall 130, an interior of port wall 132, on a monument within aircraft 100, or other locations.

First pair A-A of sensors 134 is near the front of aircraft 100 (e.g., in the negative x-direction) and adjacent to pilot cabin 124. Second pair B-B of sensors 134 and third pair C-C of sensors 134 are located between first cabin section 118 and second cabin section 120. Fourth pair D-D of sensors 134 are located near the aft of aircraft 100 (e.g., in the positive x-direction) and between second cabin section 120 and third cabin section 122. Fourth pair E-E of sensors 134 and fifth pair F-F of sensors 134 are near the aft of aircraft 100. As illustrated in FIG. 1B, each pair of sensors 134 may be spaced at various locations may have variable spacing between the transmitter and receiver in both laterally (e.g., along the y-axis) and longitudinally (e.g., along the x-axis).

In various embodiments, each pair of sensors 134 (e.g., pair A-A) may operate independently of the other sensors 134 to localize objects and/or humans within aircraft 100. In various embodiments, more than one pair of sensors 134 (e.g., pair A-A and pair B-B) may operate cooperatively to localize objects and/or humans within aircraft 100. In various embodiments, sensors 134 may be coupled to or adjacent to one or more passenger seats within aircraft 100. The operation of sensors 134 will be described in further detail below with respect to sensors being coupled to passenger seats within aircraft 100.

Figure 2A:
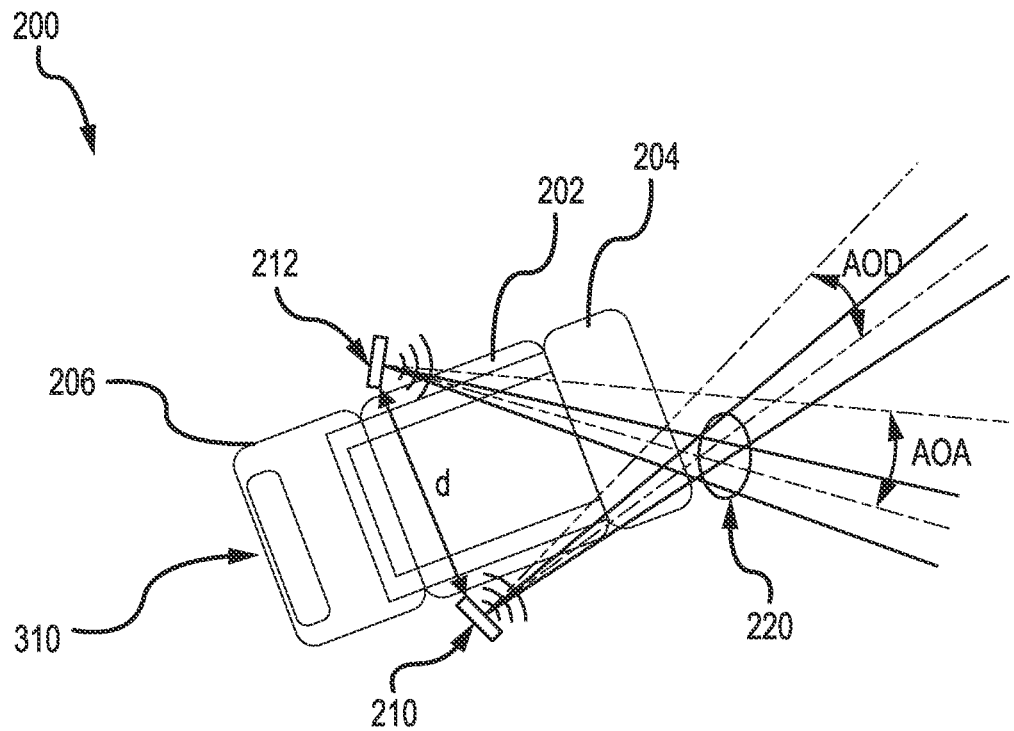
FIGS. 2A and 2B illustrate a passenger seat including an obstacle detection system, in accordance with various embodiments.
Figure 2B:
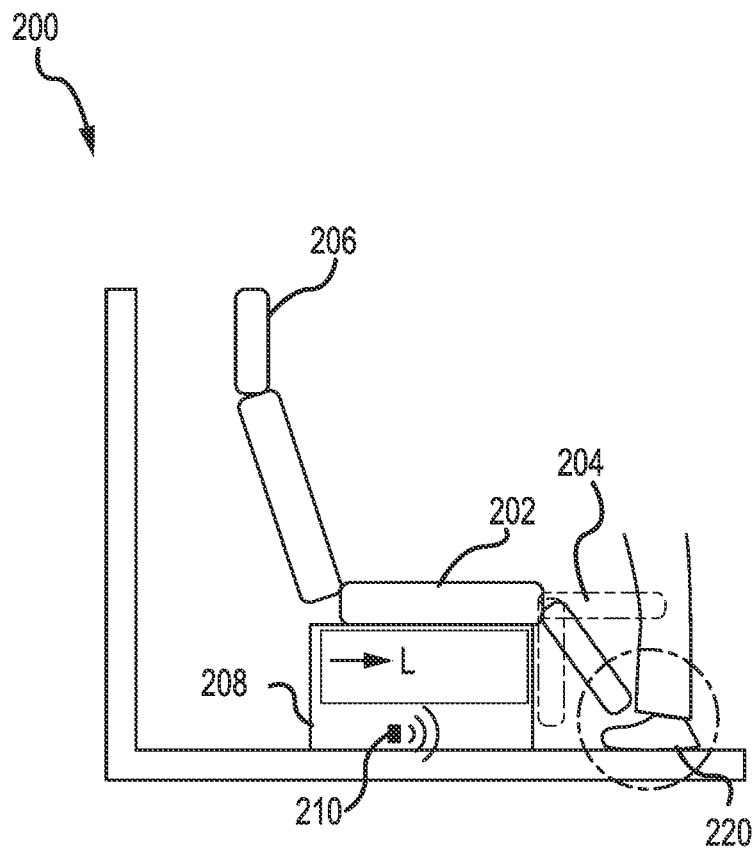

Referring now to FIGS. 2A and 2B, a passenger seat 200 for use in an aircraft is illustrated, in accordance with various embodiments. In various embodiments, passenger seat 200 may be located in first cabin section 118 or second cabin section 120 of aircraft 100. Passenger seat 200 includes a seat section 202, a footrest 204, a backrest 206, and a base 208. In various embodiments, passenger seat 200, and more specifically, seat section 202 may be configured to move longitudinally (e.g., along the x-axis) over base 208. In various embodiments, passenger seat 200 may be configured to transition from a sitting position (as illustrated in FIG. 2B) to a prone position (as illustrated in FIG. 2A). In the prone position, passenger seat 200 allows a passenger to lay flat. There are, however, various safety concerns when transitioning from the seated position to the prone position and back to the seated position as passenger seat 200 moves. For example, footrest 204 may extend and retract and backrest 206 may extend and retract.

Passenger seat 200 further includes a transmitter 210 and a receiver 212. In various embodiments, transmitter 210 and receiver 212 may be examples of sensors 134 (e.g., pair A-A) described above in FIG. 1B. In various embodiments, transmitter 210 and receiver 212 may be coupled to passenger seat 200, adjacent to passenger seat 200, or a combination thereof. Transmitter 210 and receiver 212 work together as a pair to detect and localize the object. In various embodiments, transmitter 210 and receiver 212 may be located near a base of passenger seat (e.g., in the negative z-direction). In various embodiments, transmitter 210 may be a millimeter wave (mmWave) phased array transmitter and receiver 212 may be a mmWave phased array receiver. As used herein, millimeter wave refers to wavelengths of about 10 millimeter (30 GHZ) to about 1 millimeter (300 GHz), where the term "about" in this context only means+/− 0.1 mm (3,000 GHz). Transmitter 210 and receiver 212 interface with a controller and operate together to halt the movement of passenger seat 200 in response to locating an object within the path of travel of passenger seat 200.

Object detection and localization may be performed by operating transmitter 210 in a continuous wave (CW) beam sweep mode at discrete angles over their field of view. That is, transmitter 210 continuously transmits an mmWave phased signal, sweeping the signal in three dimensions at discrete angles to the horizontal and vertical planes (e.g., the x-axis and the z-axis) and performing measurements on the received signal. First, transmitter 210 transmits a sweeping signal at a discrete angle of departure (AOD) and receiver 212 receives a reflection of the amplitude of the sweeping signal at a fixed angle of arrival (AOA). Similarly, transmitter 210 transmits the sweeping signal at different discrete angles in the azimuth plane (e.g., the x-y plane) as well as in the elevation plane (e.g., the x-z plane) and receiver 212 records the received amplitude at the same fixed angle of arrival (AOA). As the transmitted signal contacts an object 220 upon beam sweeping, a reflection amplitude of the signal is received by receiver 212 which is relatively highest, as compared to other reflection amplitudes received. The peak received amplitude variation over AOD in azimuth and elevation results in a first AOD in the azimuth plane and a second AOD in the elevation plane respectively, which is stored for object detection. Next, the beam forming is done at receiver 212 by fixing the beam forming direction of transmitter 210 to the first AOD and the second AOD. Receiver 212 receives the peak reflected signal amplitude as a first AOA in the azimuth plane and a second AOA in the elevation plane when the beam formed direction of receiver 212 is directed towards the object 220. The controller may then use the first AOA, the first AOD, the second AOA, the second AOD, the known position of transmitter 210, and the known position of receiver 212 to determine the location of object 220. Multiple objects can result in multiple peaks (i.e., peaks in the amplitude of the reflected signal) and their corresponding first and second AOD and AOA from which the locations of additional objects can be estimated.

A region of interest may be specified to confine the CW sweep of transmitter 210. In various embodiments, the region of interest may be a spatial region of interest (e.g., a three-dimensional space defined by cartesian coordinates). In various embodiments, the region of interest may be the travel path of footrest 204. In various embodiments, the region of interest may be the travel path of backrest 206. The region of interest may be defined by a set of coordinates such as $[x_1, x_2][y_1, y_2][z_1, z_2]$). To cover the region of interest, angular sectors to be scanned are discretized depending on the bit resolution of the phase shifters and the field of view of the radios in the azimuth plane and the elevation plane of transmitter 210 and receiver 212. Transmitter 210 transmits continuous signals by sweeping the formed beam of phased array at discrete angles $\theta_{T,n}$ in the azimuth plane and discrete angles of $\Phi_{T,m}$ in the elevation plane. Receiver 212 receives a reflected amplitude (e.g., off object 220) at discretized angles $\theta_{R,n}$ in the azimuth plane and discrete angles $\Phi_{R,m}$ in the elevation plane. A peak signal received after the signal amplitude crosses above a power threshold $P_T$ while the beam is steered in the azimuth direction is identified as a peak signal corresponding to an object. Similarly, for each discrete angle in azimuth, the peak signal amplitudes are extracted for angular elevation $\Phi_{R,m}$. Direction vectors $\vec{t}$ and $\vec{r}$ of radio waves emanating from transmitter 210 at location T and receiver 212 at location R, respectively, are used to determine points t and r along the vectors or rays $\vec{t}$ and $\vec{r}$ which are closest in proximity to each other and are estimated as:

$$t = T + \vec{t}\frac{-(\vec{t}\vec{r})(\vec{r}\vec{c}) + (\vec{t}\vec{c})(\vec{r}\vec{r})}{(\vec{t}\vec{t})(\vec{r}\vec{r}) - (\vec{t}\vec{r})(\vec{t}\vec{r})}$$

$$r = R + \vec{r}\frac{-(\vec{t}\vec{r})(\vec{r}\vec{c}) + (\vec{t}\vec{c})(\vec{r}\vec{r})}{(\vec{t}\vec{t})(\vec{r}\vec{r}) - (\vec{t}\vec{r})(\vec{t}\vec{r})}$$

where $\vec{c} = TR$. For each peak $P_T(\theta_{T,n}, \Phi_{T,m}, \theta_{R,n}, \Phi_{R,m})$, locations of object 220 are estimated using O=(t+r)/2. This signifies the midpoint between the two nearest points on the rays and determines the most likely location of object 220. In various embodiments, the smallest size of obstacle (e.g., object 220) that can be detected depends on angular resolution, signal-to-noise ratio, distance to the obstacle, and wavelength used.

With the use of mm Wave by transmitter 210 and receiver 212, the radio waves are able to penetrate and pass through most materials. Accordingly, transmitter 210 and/or receiver 212 may disposed within passenger seat 200 or adjacent to passenger seat 200. Furthermore, since transmitter 210 and receiver 212 use beam forming for directivity, the location of objects, or obstacles, may, in various embodiments, be minimally affected by reflections due to surrounding structures outside of the region of interest. In various embodiments, beam forming by transmitter 210 and receiver 212 may amplify the received diffused reflection from an object that reflects main, or specular, energy away from the receiver. Therefore, the system including transmitter 210 and receiver 212 may be used in constrained spaces where a mixed waveform due to multiple reflectors would otherwise complicate the obstacle localization process. Furthermore, transmitter 210 and receiver 212 may be used to localize objects, or obstacles, that are in motion to prevent collisions and injuries. Such examples may be the movement of a passenger, including hand, arm, leg, or other body part, or objects that have fallen on the ground.

It should be appreciated that while this system is described with respect to controlling the motion of passenger seat 200, the system may further be used to detect fallen or lost objects on the floor, such as under passenger seat 200. Furthermore, as previously discussed with respect to FIGS. 1A and 1B, transmitter 210 and receiver 212 may be used to determine headcounts in an aircraft by directing the beams from transmitter 210 and receiver 212 from the seat direction to determine passenger occupancy, as the distance estimated in the presence of passenger and without passenger will be different. Furthermore, the systems and methods as disclosed herein may be useful in other applications outside of the aircraft such as, for example, counting passengers in a waiting lounge or a lobby of a building.

There is a distance d between transmitter 210 and receiver 212. In various embodiments, distance d may be about the same distance as the expected distance to the obstacle (e.g., object 220), resulting in less error. In various embodiments, distance d may be greater than the expected distance to the obstacle. However, as distance d decreases, the angle between a line joining transmitter 210 and object 220 and a line joining transmitter 210 and receiver 212 increases, or the angle between a line joining receiver 212 and object 220 and the line joining transmitter 210 and receiver 212 increases, which increases the error in obstacle detection.

Figure 3A:
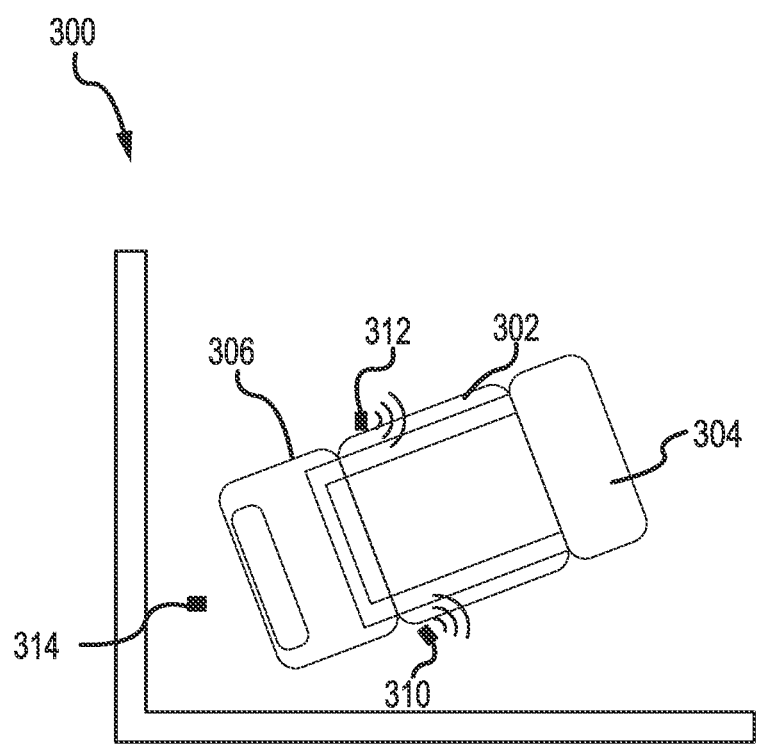
FIGS. 3A and 3B illustrate a passenger seat including an obstacle detection system, in accordance with various embodiments.
Figure 3B:
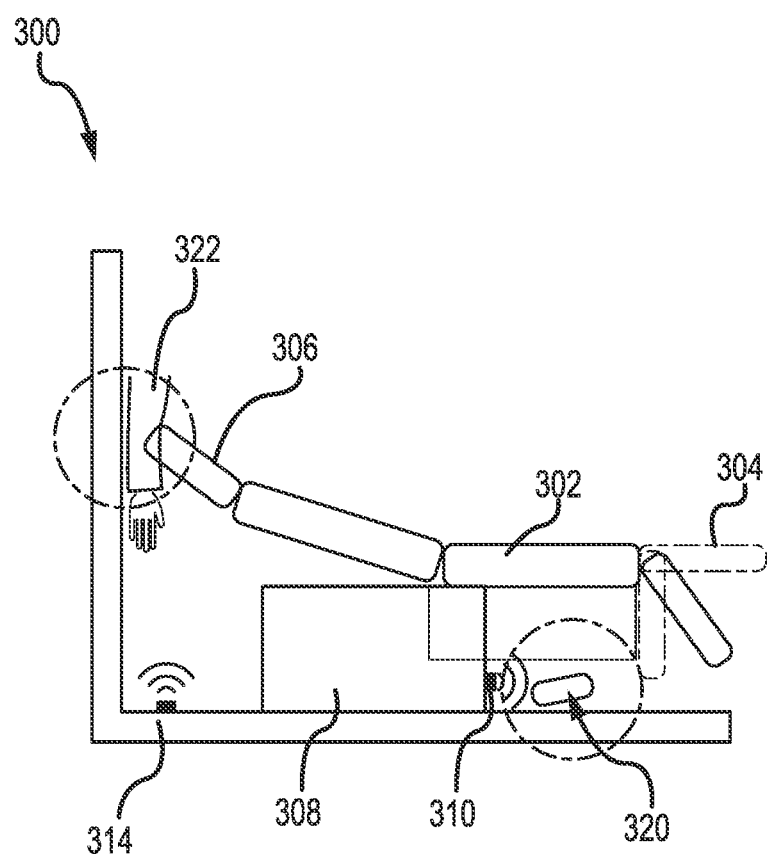

Referring now to FIGS. 3A and 3B, a passenger seat 300 for use in an aircraft is illustrated, in accordance with various embodiments. Passenger seat 300 includes similar components to passenger seat 200 described above in FIGS. 2A and 2B, including a seat section 302, a footrest 304, a backrest 306, a base 308, a transmitter 310, and a receiver 312, descriptions of which may not be repeated below. Passenger seat 300 further includes a receiver 314 configured to operate in a separate zone other than the receiver 312. In the depicted embodiment, receiver 314 covers a region of interest behind passenger seat 300 (i.e., opposite backrest 306 from seat section 302). Receiver 314 functions similarly to receiver 312 as previously described. Whereas receiver 312 monitors a region of interest adjacent footrest 304, receiver 314 monitors a region of interest adjacent backrest 306. In various embodiments, transmitter 310 may be configured to sweep both regions of interest (i.e., adjacent footrest 304 and adjacent backrest 306). In various embodiments, a second transmitter may be used for the region of interest adjacent backrest 306. Accordingly, receiver 312 may detect an object 320 on the floor while receiver 314 may detect an arm 322 of a passenger adjacent backrest 306.

Figure 4:
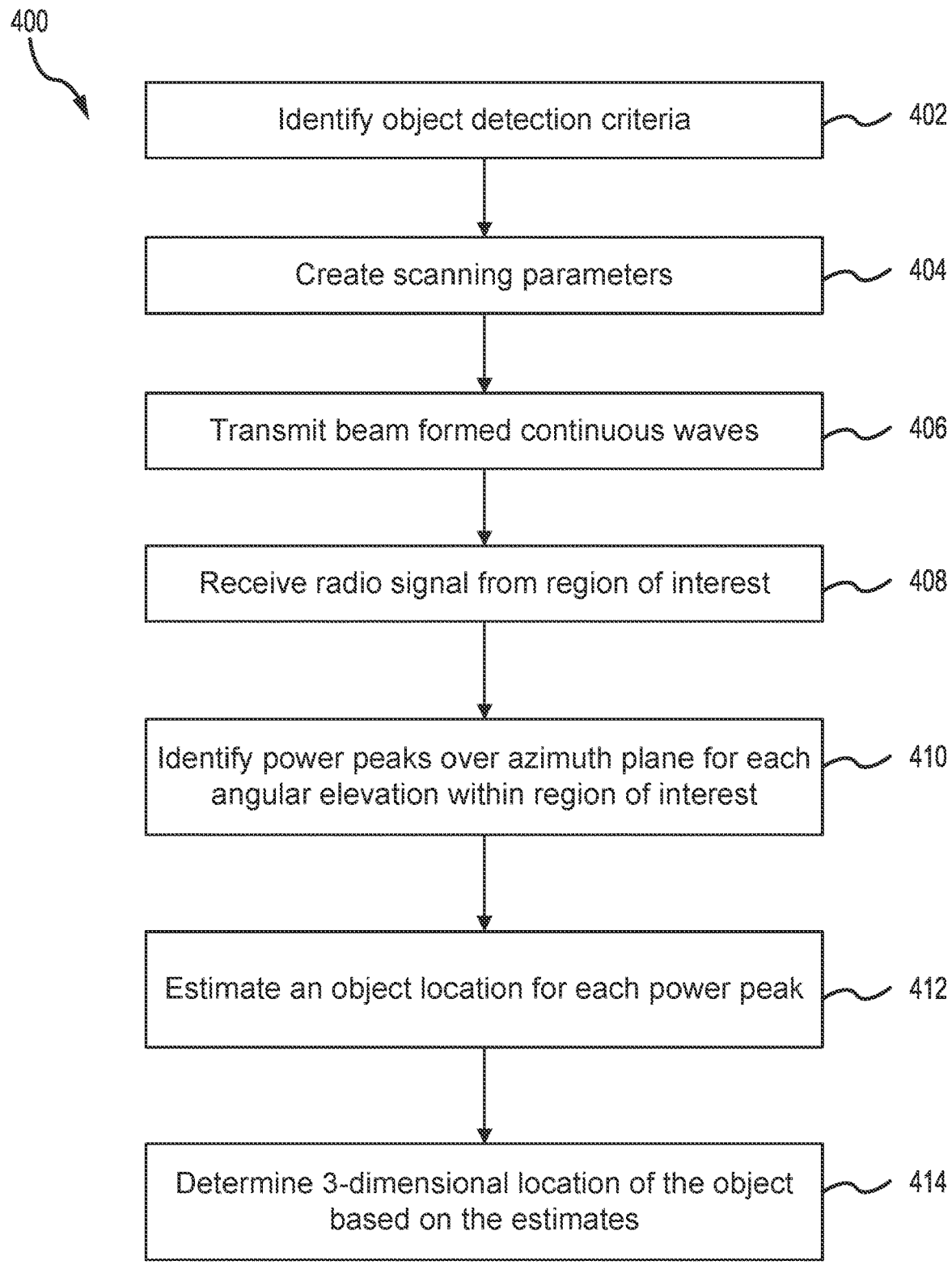
FIG. 4 illustrates a flow diagram of a method of detecting obstacles using radio waves, in accordance with various embodiments.

Referring now to FIG. 4, a method 400 of locating an object using continuous wave phase scanning is illustrated, in accordance with various embodiments. In various embodiments, method 400 may be performed by a controller, or processor, which is operatively coupled to a radio transmitter (e.g., transmitter 310) and a radio receiver (e.g., receiver 312). In various embodiments, the radio transmitter and the radio receiver may be continuous wave radios with phased array antennas that operate using millimeter wave radio frequencies.

At block 402, a processor identifies object detection criteria. In various embodiments, the object detection criteria include a region of interest and a power threshold, among other criteria. In various embodiments, the region of interest may be defined as a three-dimensional volume to be monitored for objects and/or obstacles. In various embodiments, the power threshold may be a minimum signal power at the radio receiver that indicates the presence of an object or obstacle.

At block 404, the processor creates scanning parameters based on the identified object detection criteria. In various embodiments, the scanning parameters may include discretized angular sectors for scanning the region of interest identified at block 402. That is, discrete angles that are identified within the region of interest. In various embodiments, the discretized angular sectors may include azimuth angles and elevation angles. The azimuth angles may be defined as $\theta_{T,R,n}$ where the discretized number of segments n=1:N and the elevation angles may be defined as $\Phi_{T,R,m}$ where the discretized number of segments m=1:M are within scan limits of the radio transmitter T and the radio receiver R.

At block 406, the processor sends instructions to the radio transmitter to transmit beam formed continuous waves within the region of interest. The radio transmitter transmits millimeter wave radio signals within the region of interest by scanning the azimuth plane and the elevation plane defined by the angular sectors created at block 404.

At block 408, the processor receives radio signals from the radio receiver from within the region of interest. The radio receiver scans the region of interest to receive radio signal reflections caused by one or more objects or obstacles within the region of interest.

At block 410, the processor identifies power peaks over the azimuth plane for each angular elevation within the region of interest. That is, for each angular elevation defined in block 404, the processor identifies a received power peak over the azimuth plane. A power peak indicates the presence of an object or obstacle.

At block 412, the processor estimates an angular location of the object or obstacle for each power peak. The processor estimates the angular location of one or more objects within the region of interest based on the received radio signals and the identified power peaks.

At block 414, the processor determines a three-dimensional location (e.g., in cartesian coordinates) of the one or more objects within the region of interest based on the estimated angular locations. In various embodiments, the processor may aggregate a plurality of estimated locations that are adjacent to one another, laterally and/or vertically, to identify a singular object. In various embodiments, the processor may identify more than one object based on the estimated locations being more than a minimum distance threshold from any adjacent estimated location, laterally and/or vertically.

Figure 5:
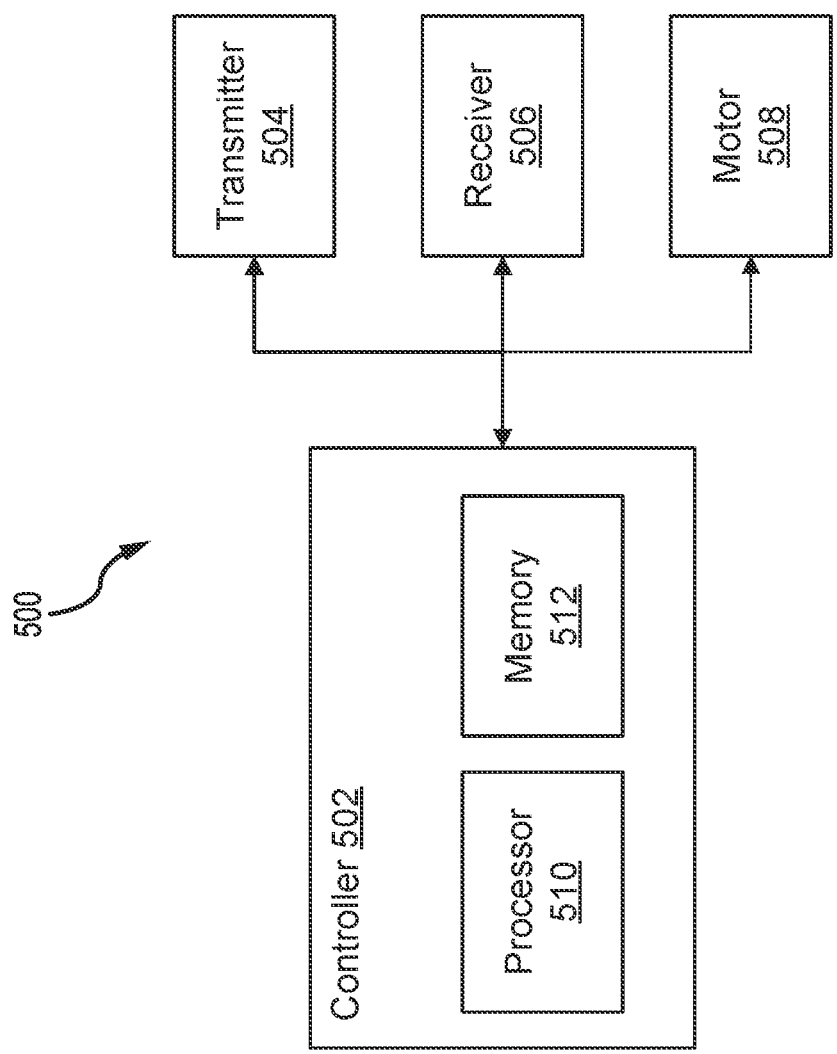
FIG. 5 illustrates a system diagram of an obstacle detection system, in accordance with various embodiments.

Referring now to FIG. 5, a diagram for a system 500 for detecting obstacles is illustrated, in accordance with various embodiments. System 500 includes a controller 502, a transmitter 504, a receiver 506, and a motor 508. Controller 502 is operatively coupled to, and configured to control, transmitter 504, receiver 506, and motor 508. Controller 502 includes a processor 510 and a memory 512. In various embodiments, controller 502, and more specifically processor 510, may be configured to perform the steps of method 400 described above in FIG. 4.

In various embodiments, controller 502 sends instructions to transmitter 504 and receiver 506 to identify the region of interest over which both transmitter 504 and receiver 506 operate. Controller 502 receives data from receiver 506 and determines the location of an object or obstacle based on the received data. In various embodiments, controller 502 may be configured to control motor 508 based on the determined location of the object or obstacle. That is, controller 502 may stop motor 508 in response to determining that an object or obstacle is located in the path of travel of a component that motor 508 is controlling.

Processor 510 may comprise one or more processors configured to implement various logical operations in response to execution of instructions, for example, instructions stored on a non-transitory, tangible, computer-readable medium. The one or more processors can be a general-purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof.

Memory 512 may comprise memory to store data, executable instructions, system program instructions, and/or controller instructions to implement the control logic of processor 510.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present. In an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for localizing an object, comprising:
a radio transmitter disposed in a first location;
a radio receiver disposed in a second location;
a processor operatively coupled to the radio transmitter and to the radio receiver;
and a memory operatively coupled to the processor,
the memory comprising instructions stored thereon that, when executed by the processor, cause the processor to:
send a first command to the radio transmitter to transmit a continuous radio wave;
send a second command to the radio receiver to receive a reflected radio wave;
receive from the radio receiver a signal indicating the reflected radio wave is within a spatial region of interest;
and determining a three-dimensional location of the object within the spatial region of interest based on the reflected radio wave,
wherein the instructions, when executed by the processor, further cause the processor to:
identify power peaks within the spatial region of interest using the reflected radio wave,
wherein a peak power amplitude indicates a possible angular location of the object;
estimate an angular location of the object based at least in part on the peak power amplitudes, the first location, and the second location;
and determine the three-dimensional location based on the estimated angular location.

2. The system for localizing the object of claim 1, wherein the radio transmitter is a millimeter wave radio including a phased array antenna and, wherein the radio receiver is a millimeter wave radio including a phased array antenna.

3. The system for localizing the object of claim 1, wherein the radio transmitter and the radio receiver are disposed in a cabin of an aircraft.

4. The system for localizing the object of claim 1, further comprising a passenger seat, wherein the radio transmitter and the radio receiver are coupled to the passenger seat.

5. The system for localizing the object of claim 1, wherein the instructions, when executed by the processor, further cause the processor to:
identify the region of interest for detecting the object;
identify a minimum threshold power for detecting the object; and
create spatial scanning parameters for use by the radio transmitter and the radio receiver.

6. The system for localizing the object of claim 5, wherein the radio transmitter transmits the continuous radio wave using the spatial scanning parameters and the radio receiver receives the reflected radio wave using the spatial scanning parameters.

7. A passenger seat, comprising:
a base;
a seat section coupled to a top surface of the base;
a footrest coupled to a first side of the base;
a backrest coupled to a second side of the base;
a transmitter coupled to a third side of the base at a first location;
a receiver coupled to a fourth side of the base at a second location; and
a controller operatively coupled to the transmitter and to the receiver, the controller being configured to:
send a command to the transmitter to transmit a scanning radio wave in a spatial region of interest;
receive from the transmitter a power level indicating a reflected radio wave within the spatial region of interest;
identify power peaks within the spatial region of interest using the reflected radio wave, wherein a peak power amplitude indicates a possible angular location of the object;
estimate an angular location of the object based at least in part on the peak power amplitude, the first location, and the second location;
and
determine a three-dimensional location of an object adjacent the base based on the power level of the reflected radio wave and on the estimated angular location.

8. The passenger seat of claim 7, further comprising:
a motor coupled to the footrest and configured to move the footrest along a path of travel, wherein the controller is further configured to stop the motor in response to determining that the object is located in the path of travel of the footrest.

9. The passenger seat of claim 7, further comprising:
a motor coupled to the backrest and configured to move the backrest along a path of travel, wherein the controller is further configured to stop the motor in response to determining that the object is located in the path of travel of the backrest.

10. The passenger seat of claim 7, further comprising:
a motor coupled to the seat section and configured to move the seat section along a path of travel, wherein the controller is further configured to stop the motor in response to determining that the object is located in the path of travel of the seat section.

11. The passenger seat of claim 7, further comprising:
a second receiver disposed adjacent the base, wherein the controller is further configured to receive a second power level indicating the reflected radio wave and determine the location of the object based on the power level and the second power level.

12. The passenger seat of claim 7, wherein the transmitter is a millimeter wave radio including a phased array antenna and, wherein the receiver is a millimeter wave radio transmitter including a phased array antenna.

13. The passenger seat of claim 7, wherein the controller is further configured to identify the region of interest, the region of interest defining a three-dimensional space adjacent the passenger seat.

14. The passenger seat of claim 7, wherein the transmitter is disposed in a first location and the receiver is disposed in a second location, wherein the controller is further configured to determine the location of the object based on the power level of the reflected radio wave, the first location, and the second location.

15. An aircraft cabin, comprising:
a first wall;
a plurality of passenger seats; and
an object localization system including:
a transmitter attached to the first wall at a first position;
a receiver attached to the first wall at a second position; and
a controller operatively coupled to the transmitter and the receiver, the controller being configured to
send commands to the transmitter to transmit a continuous radio wave within a region of interest in the aircraft cabin,
receive data from the receiver indicating power levels of reflected radio waves within the region of interest,
identify power peaks within the region of interest using the reflected radio waves, wherein a peak power amplitude indicates a possible angular location of a plurality of passengers,
estimate an angular location of the plurality of passengers based at least in part on the peak power amplitudes, the first location, and the second location,
determine a three-dimensional location based on the estimated angular location,
and
identify a head count of passengers in the plurality of passenger seats based at least in part on the received power levels and estimated angular location.

16. The aircraft cabin of claim 15, wherein the transmitter is a millimeter wave radio including a phased array antenna and, wherein the receiver is a millimeter wave radio including a phased array antenna.

17. The aircraft cabin of claim 15, wherein the controller is further configured to identify the region of interest as a three-dimensional space within the aircraft cabin and identify a minimum threshold power for determining the head count of passengers.

18. The aircraft cabin of claim 15, wherein the controller is further configured to create scanning parameters for use by the transmitter and the receiver, the scanning parameters indicating a discrete angle of azimuth and a discrete angle of elevation within the region of interest.

19. The aircraft cabin of claim 15, further comprising:
a second wall, wherein the plurality of passenger seats are disposed between the first wall and the second wall;
wherein the object localization system further includes:
a second transmitter attached to the second wall at a third position; and
a second receiver attached to the second wall at a fourth position;
wherein the controller is operatively coupled to the second transmitter and the second receiver, the controller being further configured to command the second transmitter to transmit a second continuous radio wave and to localize an object adjacent the second wall based at least in part on a second reflected radio wave received from the receiver.

* * * * *